(12) United States Patent
Pajona et al.

(10) Patent No.: US 11,714,155 B2
(45) Date of Patent: Aug. 1, 2023

(54) METHOD FOR FINDING SIGNAL DIRECTION USING MODAL ANTENNA

(71) Applicant: Kyocera AVX Components (San Diego), Inc., San Diego, CA (US)

(72) Inventors: Olivier Pajona, Antibes (FR); Michael Roe, San Diego, CA (US); Mohd Faizal Mohd Zaini, Juan les Pins (FR); Sebastian Rowson, San Diego, CA (US); Laurent Desclos, San Diego, CA (US)

(73) Assignee: Kyocera AVX Components (San Diego), Inc., San Diego, CA (US)

( * ) Notice: Subject to any disclaimer, the term of this patent is extended or adjusted under 35 U.S.C. 154(b) by 0 days.

(21) Appl. No.: 17/194,885

(22) Filed: Mar. 8, 2021

(65) Prior Publication Data

US 2021/0190895 A1    Jun. 24, 2021

Related U.S. Application Data

(63) Continuation of application No. 15/979,971, filed on May 15, 2018, now Pat. No. 10,942,243, which is a continuation of application No. 14/660,086, filed on Mar. 17, 2015, now Pat. No. 9,983,290.

(60) Provisional application No. 61/954,506, filed on Mar. 17, 2014.

(51) Int. Cl.
| | |
|---|---|
| *G01S 3/28* | (2006.01) |
| *H01Q 25/04* | (2006.01) |
| *H01Q 1/24* | (2006.01) |
| *G01S 3/06* | (2006.01) |
| *G01S 3/16* | (2006.01) |

(52) U.S. Cl.
CPC ................... *G01S 3/28* (2013.01); *G01S 3/06* (2013.01); *G01S 3/16* (2013.01); *H01Q 1/243* (2013.01); *H01Q 25/04* (2013.01)

(58) Field of Classification Search
None
See application file for complete search history.

(56) References Cited

U.S. PATENT DOCUMENTS

| | | | |
|---|---|---|---|
| 6,765,536 | B2 | 7/2004 | Phillips et al. |
| 6,987,493 | B2 | 1/2006 | Chen |
| 7,068,234 | B2 | 6/2006 | Sievenpiper |
| 7,215,289 | B2 | 5/2007 | Harano |
| 7,313,403 | B2 | 12/2007 | Gong |
| 7,911,402 | B2 | 3/2011 | Rowson et al. |

(Continued)

FOREIGN PATENT DOCUMENTS

| | | |
|---|---|---|
| CN | 102142879 | 8/2011 |
| RU | 2 126 571 | 2/1999 |

*Primary Examiner* — Whitney Moore
(74) *Attorney, Agent, or Firm* — Dority & Manning, P.A.

(57) ABSTRACT

Methods directed to finding algorithms designed to estimate the angle of arrival of signals incoming to a communication device by using a modal antenna having multiple radiation patterns are provided. In particular, a method can include obtaining a gain variation between adjacent modes of a plurality of antenna modes at each of a plurality of angles. The method can include obtaining a signal strength variation between the adjacent modes at each of the plurality of angles. The method can include determining a difference value based, at least in part, on the gain variation and the signal strength variation. The method can include determining an angle of arrival of the signal based, at least in part, on the difference value.

10 Claims, 12 Drawing Sheets

(56) References Cited

U.S. PATENT DOCUMENTS

| | | | |
|---|---|---|---|
| 8,362,962 B2 | 1/2013 | Rowson et al. |
| 8,446,318 B2 | 5/2013 | Ali et al. |
| 8,648,755 B2 | 2/2014 | Rowson et al. |
| 8,988,289 B2 | 3/2015 | Shamblin |
| 9,065,496 B2 | 6/2015 | Rowson et al. |
| 9,231,669 B2 | 1/2016 | Desclos et al. |
| 9,240,634 B2 | 1/2016 | Rowson et al. |
| 9,425,497 B2 | 8/2016 | Pajona et al. |
| 9,439,151 B2 | 9/2016 | Zhu et al. |
| 9,479,242 B2 | 10/2016 | Desclos et al. |
| 9,551,777 B2 | 1/2017 | Stoddard |
| 9,590,703 B2 | 3/2017 | Desclos et al. |
| 9,755,580 B2 | 9/2017 | Desclos et al. |
| 2008/0297401 A1 | 12/2008 | Nishida |
| 2009/0224991 A1 | 9/2009 | Rowson et al. |
| 2013/0099987 A1 | 4/2013 | Desclos |
| 2013/0194133 A1 | 8/2013 | Desclos |

| Previous Mode | Current Mode | Gain Variation at $(\Theta_0, \Phi_0)$ in dB | Signal Strength Variation in dB |
|---|---|---|---|
| 0 | 1 | -2.10 | -1.50 |
| 0 | 2 | -1.05 | -3.50 |
| 1 | 2 | -4.20 | -4.10 |
| 0 | 3 | ... | ... |
| 1 | 3 | ... | ... |
| 2 | 3 | ... | ... |

FIG. 11

METHOD FOR FINDING SIGNAL DIRECTION USING MODAL ANTENNA

CROSS-REFERENCE TO RELATED APPLICATIONS

The present application claims priority to U.S. application Ser. No. 15/979,971, filed May 15, 2018, titled "METHOD FOR FINDING SIGNAL DIRECTION USING MODAL ANTENNA," which claims priority to U.S. application Ser. No. 14/660,086, filed Mar. 17, 2015, titled "METHOD FOR FINDING SIGNAL DIRECTION USING MODAL ANTENNA" (issued as U.S. Pat. No. 9,983,290 on Oct. 29, 2015), which claims benefit of priority to U.S. Provisional Ser. No. 61/954,506, filed Mar. 17, 2014, titled "METHOD FOR FINDING SIGNAL'S DIRECTION USING MODAL ANTENNA"; the contents of which are hereby incorporated by reference.

BACKGROUND

Field of the Invention

This invention relates generally to wireless communications; and more particularly, to methods for finding direction of a signal using an active multi-mode antenna.

Description of the Related Art

As new generations of wireless communication devices become smaller and embedded with increased applications, new antenna designs, system configurations and controlling algorithms are required to enable new capabilities and to improve QOS. For example, geolocation is a function to identify the geographic location of a mobile device, such as a cellular phone, a smart phone, a laptop, a tablet, an internet-connected computer terminal and other wireless communication device. These devices are expected to incorporate the location-determining function because of emergency "911" services, public safety and law enforcement concerns. Furthermore, in the emerging vehicle-to-vehicle communication protocols, the location-determining function enables one car to steer the communication signal following the movement of the other car, thereby improving the quality of the communication link and reducing electromagnetic interferences. Such geolocation or location-determining functions can be achieved by configuring an antenna system to find the direction of RF signals.

Direction finding, a.k.a. the angel of arrival (AOA) estimation, generally refers to a method of determining the direction of arrival of incoming signals, and plays an important role in spectrum monitoring as well as in reconnaissance and surveillance applications. Typically, the direction finding utilizes an array of antennas that detect incoming RF signals, wherein phase and amplitude information is correlated to calculate the direction of arrival of the signals. In such a conventional direction finding system, one receiver is provided for each antenna, in particular when high resolution is needed in situations where multipath interferences or co-channel signals exist. This configuration allows for continuous sampling of information received by each antenna. However, the drawback is that it is costly and requisite of a large space to provide multiple antennas and receive chains. As is typically the case when a multi-antenna system is used, electromagnetic coupling among the antennas as well as between the antennas and nearby electronics often deteriorates transmission and reception qualities. Additionally, efficiency may deteriorate in many instances where multiple RF chains are energized and power consumption increases.

BRIEF DESCRIPTION OF THE DRAWINGS

FIG. 11 is a table illustrating an example of gain variations and signal strength variations used for the decision making.

DETAILED DESCRIPTION

In view of the above problems associate with direction finding based on a multi-antenna system, this document provides a new type of direction finding methods based on a single antenna capable of producing multiple radiations patterns.

Figure 1:
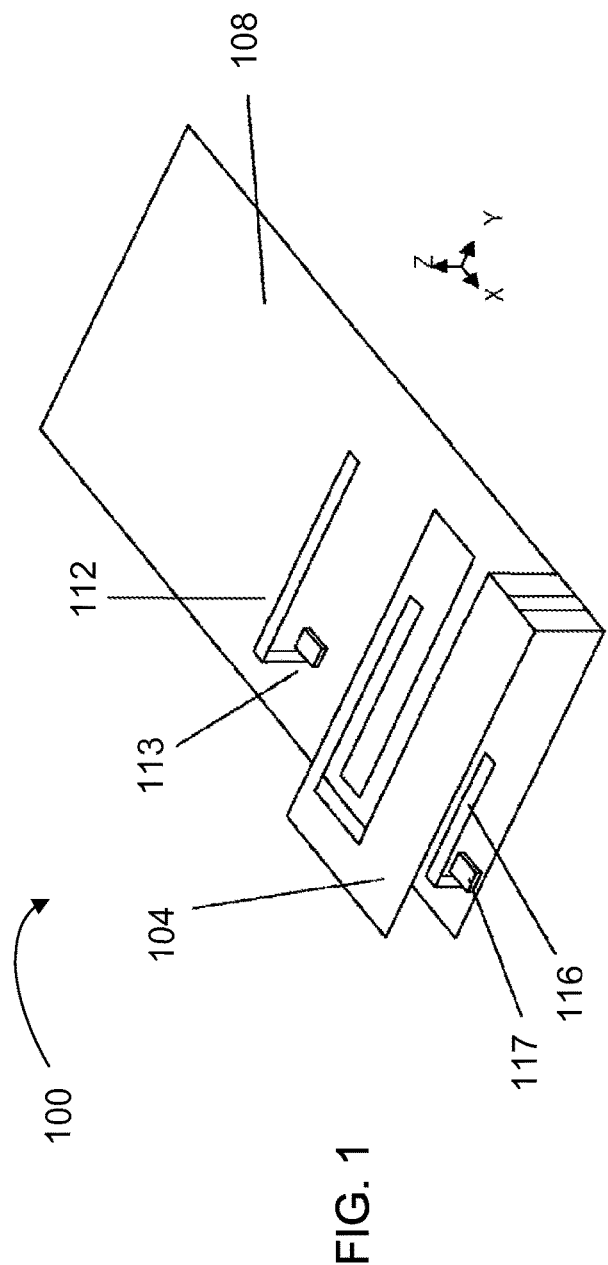
FIG. 1 illustrates an example of a modal antenna.

A modal antenna, also referred to as a null-steering antenna, can generate multiple modes corresponding to multiple radiation patterns, equivalent to having a set of antennas with the same feed. By using the modal antenna capable of generating different radiation patterns, it is possible to exploit a priori knowledge of antenna nulls and lobes in the different modes for steering the beam to have nulls in dominant interference directions while keeping gain in desired directions. Accordingly, implementation of a modal antenna may allow for pattern diversity with one antenna, thereby requiring less volume and area than using multiple antennas. Examples of structures and implementations of the modal antennas are provided in U.S. Pat. No. 7,911,402, entitled "ANTENNA AND METHOD FOR STEERING ANTENNA BEAM DIRECTION," issued on Mar. 22, 2011; the contents of the which are hereby incorporated by reference and are summarized as follows:

FIG. 1 illustrates an example of a modal antenna 100, which includes an Isolated Magnetic Dipole™ (IMD) element 104 placed on a ground plane 108, a first parasitic element 112 coupled to an first active element 113, and a second parasitic element 116 coupled to a second active element 117. The active elements 113 and 117 may include switches that either electrically connect (short) or disconnect (open) the parasitic elements 112 and 116 to the ground plane 108. This structure allows for two different modes of operation with a common frequency corresponding to a first state where the parasitic elements 112 and 116 are shorted to the ground and a second state where the parasitic elements 112 and 116 are open.

Figure 2B:
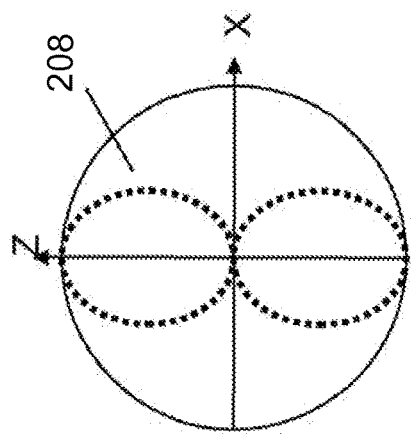
FIG. 2(b) illustrates a radiation pattern associated with the modal antenna of FIG. 1 in the second state.
Figure 2A:
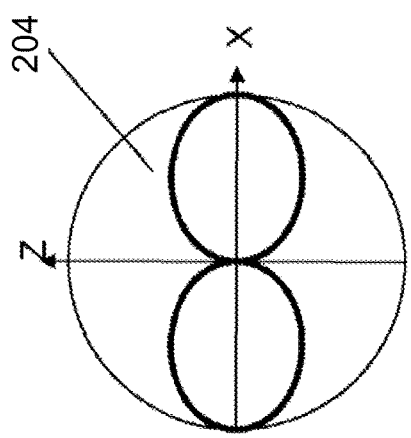
FIG. 2(a) illustrates a radiation pattern associated with the modal antenna of FIG. 1 in the first state.

FIG. 2(a) illustrates a radiation pattern 204 associated with the antenna 100 in the first state; and FIG. 2(b) illustrates a radiation pattern 208 in the second state, which shows a ninety-degree shift in direction as compared to the radiation pattern 204. Thus, by controlling the active elements 113 and 117 of the modal antenna 100, the operation of two modes can be obtained at the same frequency. The control scheme can be extended for three or more multimode operations by incorporating, for example, tunable elements in the active elements for variable control and additional active elements for matching. Examples of these active elements include switches, tunable capacitors, tunable phase shifters, diodes, micro-electro-mechanical system (MEMS) switches, MEMS tunable capacitors, and transistors including a metal oxide semiconductor field effect transistor (MOSFET), a metal semiconductor field effect transistor (MESFET), a pseudomorphic high electron mobility transistor (pHEMT), a heterojunction bipolar transistor (HBT) or of other suitable technologies.

Direction finding algorithms according to embodiments, to estimate the angle of arrival (AOA) of RF signals by using a modal antenna having multiple radiations patterns, are explained below with reference to the subsequent figures.

In these algorithms, the modal antenna is configured to have multiple (N) antenna modes, corresponding to multiple radiation patterns K=0, 1 . . . and N−1; i.e. the modal antenna produces a distinct radiation pattern in each distinct antenna mode of the N modes. The spherical coordinate is used to estimate the AOA of the signal, which is denoted as $(\Theta_0,\Phi_0)$. The $(\Theta,\Phi)$-space is spanned prior to the direction finding procedure, and all possible discrete values of $\Theta$ and $\Phi$ to consider according to the required resolution are listed in the group, or a set, Set $\{\Theta,\Phi\}$. $G^K(\Theta,\Phi)$ denotes the gain in dB of the modal antenna with the K-th radiation pattern at the angle $(\Theta,\Phi)$, which can be premeasured and stored in a memory. $E^K(\Theta,\Phi)$ denotes the difference in gain in dB between the current mode having the K-th radiation pattern and the previous mode having the (K−1)-th radiation pattern at the angle $(\Theta,\Phi)$, and is defined as follows:

$$E^K(\Theta,\Phi)=G^K(\Theta,\Phi)-G^{K-1}(\Theta,\Phi),\quad \text{Eq. (1)}$$

where K=1, 2 . . . and N, and $EN(\Theta,\Phi)$ is defined as $[G0(\Theta,\Phi)-GN-1(\Theta,\Phi)]$. $S^K$ denotes the signal strength in dBm in the configuration with the K-th radiation pattern, where K=0, 1 . . . and N−1. $\Delta^K$ denotes the difference in signal strength in dB between the configurations with the K-th radiation pattern and the (K−1)-th radiation pattern, and is defined as follows:

$$\Delta K=S^K-S^{K-1},\quad \text{Eq. (2)}$$

where K=1, 2 . . . and N, and $\Delta^N$ is defined as $[S^0-S^{N-1}]$.

Having defined the above parameters, computation can be made to obtain the difference between the gain variation $E^K(\Theta,\Phi)$ and the signal strength variation $\Delta_K$ at each angle $(\Theta,\Phi)$ as follows:

$$Err^K(\Theta,\Phi)=[E^K(\Theta,\Phi)-\Delta^K]^2,\quad \text{Eq. (3)}$$

where K=1, 2 . . . and N, and the power of 2 is taken for having a positive number for the sake of computational convenience. Accordingly, the contributions from all configurations with different radiation patterns can be obtained as follows:

$$Err(\Theta,\Phi)=\sum_{K=1}^{N} Err^K(\Theta,\Phi).\quad \text{Eq. (4)}$$

Therefore, the AOA $(\Theta_0,\Phi_0)$ of the signal may be obtained by finding the minimum of the above quantity in Eq. (4) over all pairs of $(\Theta,\Phi)$ in Set$\{\Theta,\Phi\}$ as follows:

$$Err(\Theta_0,\Phi_0)=\min[Err(\Theta,\Phi)],\quad \text{Eq. (5)}$$

where $(\Theta_0,\Phi_0) \in$ Set $\{\Theta,\Phi\}$.

Figure 3:
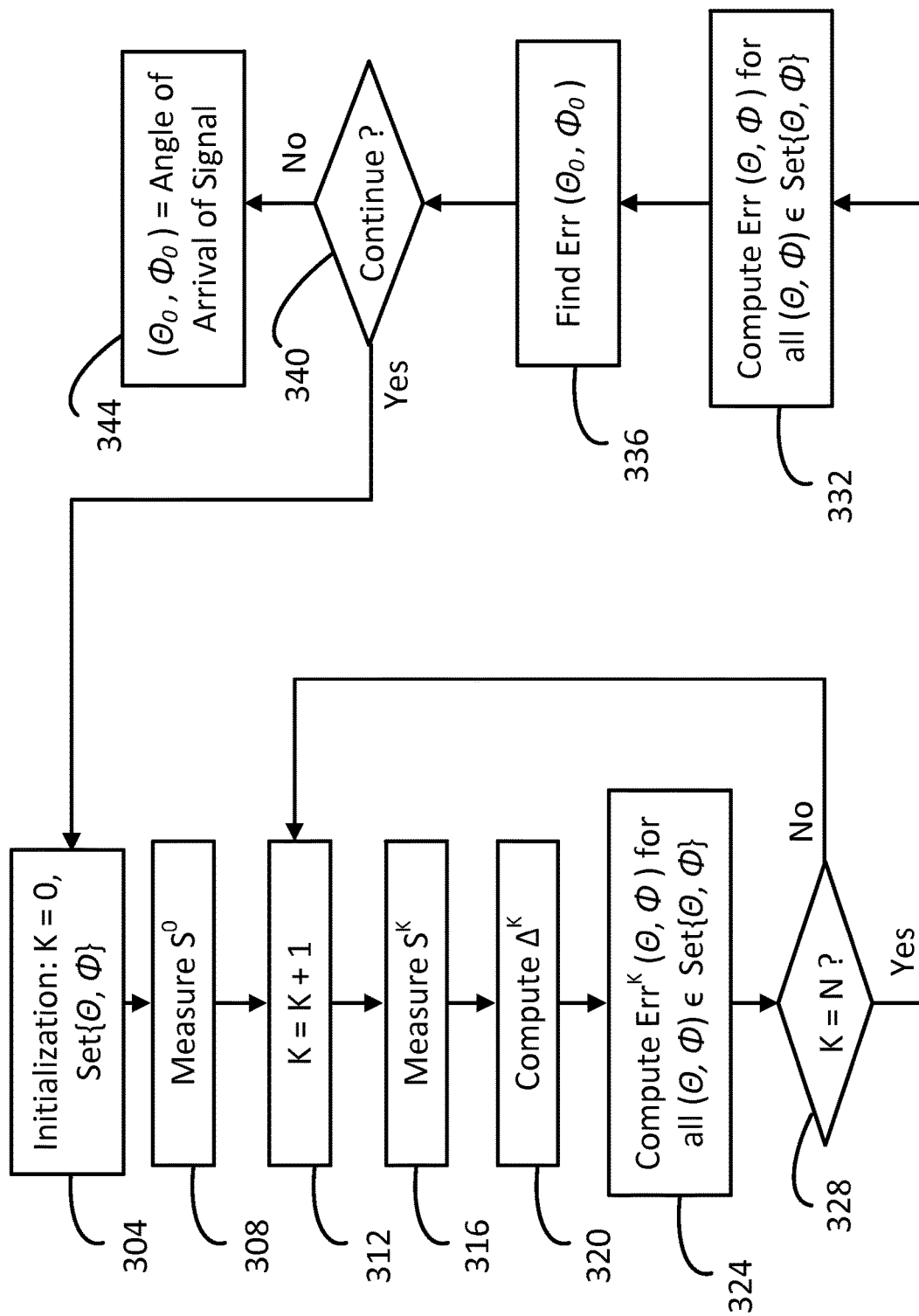
FIG. 3 is a flowchart illustrating a first direction finding algorithm to obtain the angle that gives the minimum of $Err(\Theta,\Phi)$ as the AOA of the signal.

FIG. 3 is a flowchart illustrating a first direction finding algorithm to obtain the angle that gives the minimum of $Err(\Theta,\Phi)$ as the AOA of the signal according to the above procedure. The initialization is carried out in step 304, to set the mode, i.e., the radiation pattern of the modal antenna, to be K=0. Additionally, in this step, the discrete values of $(\Theta,\Phi)$ to span in the spherical coordinate are determined according to the required resolution, and stored in Set $\{\Theta,\Phi\}$. In step 308, the signal strength in the configuration with the 0-th radiation pattern, $S^0$, is measured. Steps 312-328 represent the do-loop to compute $Err^K(\Theta,\Phi)$ iteratively from K=1 to K=N. Specifically, after the radiation pattern is changed to the next pattern in step 312, the signal strength in the new configuration with the K-th radiation pattern, $S^K$, is measured in step 316. Using the previous measurement value $S^{K-1}$, the difference in signal strength between the configurations with the K-th radiation pattern and the (K−1)-th radiation pattern, i.e., the signal strength variation, can be computed as in Eq. (2), i.e., $\Delta^K=S^K-S^{K-1}$, in step 320. Using the measured signal strength variation $\Delta^K$ and the premeasured and stored $G^K(\Theta,\Phi)$ value, which is the gain of the modal antenna at the angle $(\Theta,\Phi)$ when the K-th radiation pattern is selected, step 324 proceeds to compute $Err^K(\Theta,\Phi)$ as in Eq. (3), i.e., $Err^K(\Theta,\Phi)=[E^K(\Theta,\Phi)-\Delta^K]^2$, where $E^K(\Theta,\Phi)=G^K(\Theta,\Phi)-G^{K-1}(\Theta,\Phi)$, which is the gain variation, as in Eq. (1). In step 324, this computation is carried out for each pair of $(\Theta,\Phi)$ values in Set $\{\Theta,\Phi\}$. After the computation of $Err^K(\Theta,\Phi)$ for each pair of $(\Theta,\Phi)$ values for K=1 through N, in step 332, $Err^K(\Theta,\Phi)$ for all configurations with different radiation patterns is summed as in Eq. (4) to obtain $Err(\Theta,\Phi)$ for each pair of $(\Theta,\Phi)$ values in Set $\{\Theta,\Phi\}$. In step 336, among $Err(\Theta,\Phi)$ values for all pairs of $(\Theta,\Phi)$ in Set $\{\Theta,\Phi\}$, $Err(\Theta,\Phi)$ that gives the minimum is found. If the process is determined to be terminated in step 340, the $(\Theta,\Phi)$ value that gives the minimum $Err(\Theta,\Phi)$ is outputted as the AOA $(\Theta_0,\Phi_0)$ in step 344. If the process is determined to be continued in step 340, the process goes back to step 304 for initialization, and the subsequent steps are repeated.

In the above algorithm, the AOA $(\Theta_0,\Phi_0)$ is obtained as the angle that gives the minimum of $Err(\Theta,\Phi)$ over all pairs of $(\Theta,\Phi)$ in Set $\{\Theta,\Phi\}$. Alternatively, the AOA $(\Theta_0,\Phi_0)$ may be obtained as the angle that gives the minimum of $Err^K(\Theta,\Phi)$ for the configuration with the K-th radiation pattern, except that the pair of $(\Theta,\Phi)$ is selected from a limited set of angles that satisfy certain criteria.

Figure 4:
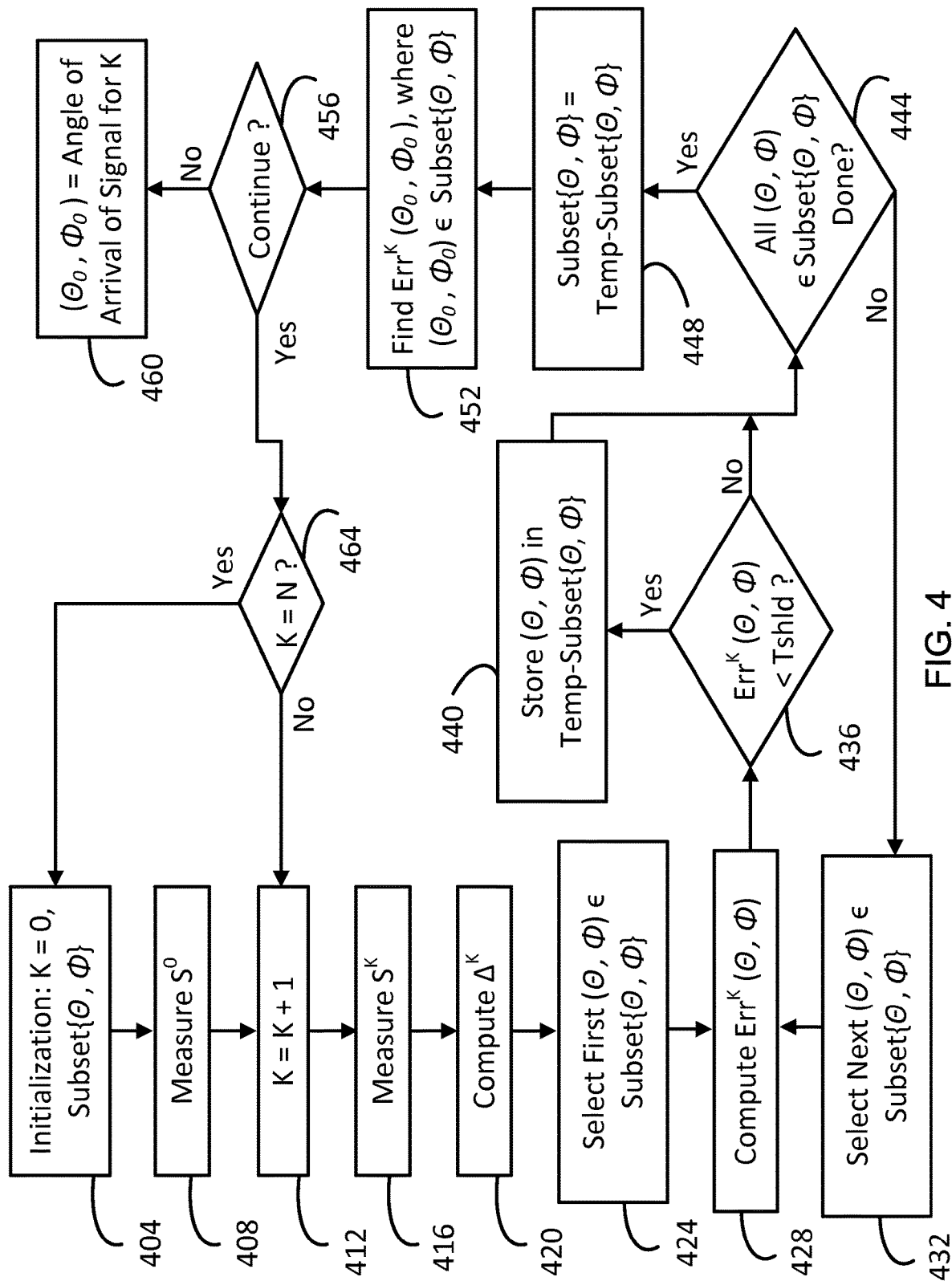
FIG. 4 is a flowchart illustrating a second direction finding algorithm to obtain the angle that gives the minimum of $Err^K(\Theta,\Phi)$ as the AOA of the signal for the K-th mode, where the angle $(\Theta,\Phi)$ is selected from a limited set of angles that satisfy certain criteria.

FIG. 4 is a flowchart illustrating a second direction finding algorithm to obtain the angle that gives the minimum of $Err^K(\Theta,\Phi)$ as the AOA of the signal for the K-th mode, where the angle $(\Theta,\Phi)$ is selected from a limited set of angles that satisfy certain criteria. The initialization is carried out in step 404, to set the mode, i.e., the radiation pattern of the modal antenna, to be K=0. Additionally, in this step, the discrete values of $(\Theta,\Phi)$ to span in the spherical coordinate are determined according to certain criteria, and stored in Subset $\{\Theta,\Phi\}$. The angles $(\Theta,\Phi)$ in the initial Subset $\{\Theta,\Phi\}$ may be selected from the original Set $\{\Theta,\Phi\}$ according to an empirical judgment based on the prior computational results or measured data or other sound engineering judgment. In step 408, the signal strength in the configuration with the 0-th radiation pattern, $S^\circ$, is measured. Steps 412-464 represent the do-loop to compute $Err^K(\Theta,\Phi)$ iteratively from K=1 to K=N. After the radiation pattern is changed to the next pattern in step 412, the signal strength in the new configuration with the K-th radiation pattern, $S^K$, is measured in step 416. Using the previous measurement value $S^{K-1}$, the difference in signal strength between the configurations with the K-th radiation pattern and the (K-1)-th radiation pattern, i.r., the signal strength variation, can be computed as in Eq. (2), i.e., $\Delta^K=S^K S^{K-1}$, in step 420. In step 424, the first pair of $(\Theta,\Phi)$ is selected from Subset $\{\Theta,\Phi\}$. Using the measured signal strength variation $\Delta^K$ and the premeasured and stored $G^K(\Theta,\Phi)$ value, which is the gain of the modal antenna at the angle $(\Theta,\Phi)$ when the K-th radiation pattern is selected, step 428 proceeds to compute $Err^K(\Theta,\Phi)$ as in Eq. (3), i.e., $Err^K(\Theta,\Phi)=[E^K(\Theta,\Phi)-\Delta^K]^2$, where $E^K(\Theta,\Phi)=G^K(\Theta,\Phi)-G^{K-1}(\Theta,\Phi)$, which is the gain variation, as in Eq. (1). After the computation of $Err^K(\Theta,\Phi)$ for the pair of $(\Theta,\Phi)$, it is judged in step 436 if the $Err^K(\Theta,\Phi)$ value is smaller than a predetermined threshold, Tshld, which is related to a tolerance in judging the accuracy of the final AOA. If Yes, in step 440, the angle $(\Theta,\Phi)$ that gives the relationship, $Err^K(\Theta,\Phi)<Tshld$, is stored in Temp-Subset $\{\Theta,\Phi\}$. If No in step 436 as well as after step 440, the process proceeds to step 444, where it is judged if all the angles $(\Theta,\Phi)$ in Subset $\{\Theta,\Phi\}$ have been exhausted. If No in step 444, the next pair of angles $(\Theta,\Phi)$ in Subset $\{\Theta,\Phi\}$ is selected in step 432, and the process from step 428 through step 432 is repeated until all the angles $(\Theta,\Phi)$ in Subset $\{\Theta,\Phi\}$ are exhausted. In step 448, Subset $\{\Theta,\Phi\}$ is replaced with Temp-Subset $\{\Theta,\Phi\}$, which means only the angles $(\Theta,\Phi)$ that satisfy the relationship, $Err^K(\Theta,\Phi)<Tshld$, are selected and stored as the updated Subset $\{\Theta,\Phi\}$. In step 452, among $Err^K(\Theta,\Phi)$ values for all pairs of $(\Theta,\Phi)$ in Subset $\{\Theta,\Phi\}$, $Err(\Theta,\Phi)$ that gives the minimum is found. If the process is determined to be terminated in step 456, the $(\Theta,\Phi)$ value that gives the minimum $Err^K(\Theta,\Phi)$ is outputted as the AOA $(\Theta_0,\Phi_0)$ for the given K in step 460. If the process is determined to be continued in step 456, the process goes to step 464 to judge if K=N has been reached. If No, the next K is selected in 412 and the process at step 416 and afterward is repeated. If Yes, the process goes back to step 404 for initialization, and the subsequent step are repeated.

In the above first and second algorithms, the $E^K(\Theta,\Phi)$ values are obtained by using the gain values of the modal antenna, $G^K(\Theta,\Phi)$, which can be premeasured and stored in the memory. In addition to the antenna gain in free space, antenna gains under various use conditions or environments can also be premeasured and stored in the memory. For example, the radiation patterns may be disturbed because of placement of a head, a hand, laps, wood, metal, or other interference-causing objects, with different positions and angles, in the proximity of the antenna. The antenna gains under such different conditions or environments can be premeasured and stored in the memory. Furthermore, one or more sensors may be included in the device to detect the use conditions or environments. Such sensors may include a proximity sensor, a motion sensor, a light sensor, a pressure sensor or other types of sensors. During the actual operation, the sensor is configured to detect the use condition or the environment during each time interval, and send the detected information to a controller, which is configured to select the gain values corresponding to the detected condition or environment. These premeasured $G^K(\Theta,\Phi)$ values that are stored in the memory according to conditions or environments can then be used to obtain the $E^K(\Theta,\Phi)$ values in the first and second algorithms.

Figure 5:
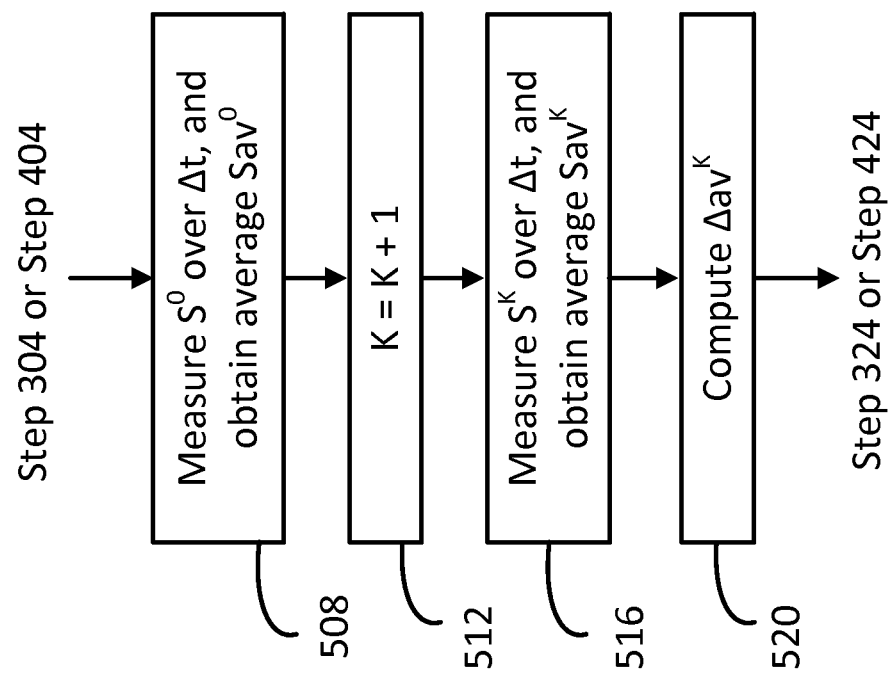
FIG. 5 is a flowchart illustrating the procedure for taking signal strength changes into account.

In the actual application of the above two algorithms, there is a possibility that the actual signal strength changes during the time between measurements for the configurations with the K-th and (K-1)-th radiation patterns, giving rise to an inaccurate estimation of the AOA. To take into account such changes, the signal strength can be measured over a predetermined time period, and the time average of the signal strength can be used in the direction finding algorithms. FIG. 5 is a flowchart illustrating the procedure for taking signal strength changes into account, which can be incorporated in each of the first and second algorithms described with reference to FIGS. 3 and 4, respectively. After step 304 in the first algorithm or step 404 in the second algorithm, the process may proceed to step 508. In step 508, the signal strength in the configuration with the 0-th radiation pattern, $S^0$, is measured over a certain time period $\Delta t$, and the average of $S^0$ over $\Delta t$ is obtained as $Sav^0$. After the radiation pattern is changed to the next pattern in step 512, the signal strength in the new configuration with the K-th radiation pattern, $S^K$, is measured over a certain time period $\Delta t$, and the average of $S^K$ over $\Delta t$ is obtained as $Sav^K$ in step 516. Using the previous measurement value $Say^{K-1}$, the difference in signal strength between the configurations with the K-th radiation pattern and the (K-1)-th radiation pattern can be computed as in Eq. (2), i.e., $\Delta av^K=Sav^K-Sav^{K-1}$, in step 520. Thereafter, the process proceeds to step 324 in the first algorithm or step 424 in the second algorithm.

Figure 6:
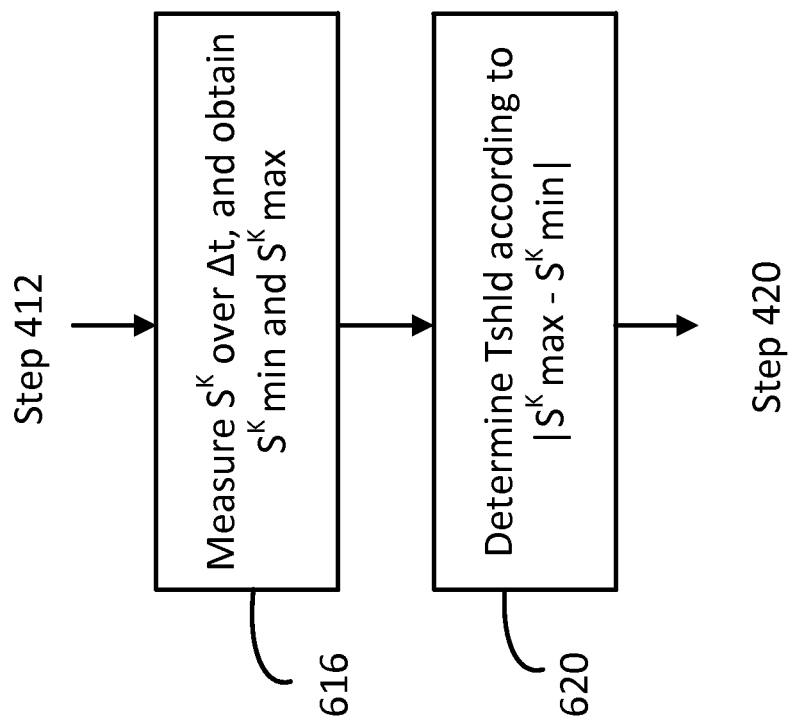
FIG. 6 is a flowchart illustrating the procedure for taking signal strength changes into account, which can be incorporated in the second algorithm.

Additionally or alternatively, the change of signal strength between measurements can be taken into account by varying the parameter Tshld in the second algorithm according to the magnitude of the signal strength change over a certain time period. FIG. 6 is a flowchart illustrating the procedure for taking signal strength changes into account, which can be incorporated in the second algorithm described with reference to FIG. 4. After the radiation pattern is changed to the next pattern in step 412, the signal strength in the new configuration with the K-th radiation pattern, $S^K$, is measured over a certain time period $\Delta t$, and the minimum and maximum of $S^K$ during $\Delta t$ is obtained as $S^K min$ and $S^K max$, respectively, in step 616. The parameter Tshld is then determined according to the magnitude of $|S^K max-S^K min|$ in step 620. In general, the larger the $|S^K max-S^K min|$ is, the larger the Tshld value is to accommodate the variation. The process may proceed to step 420 to compute $\Delta^K=S^K-S^{K-1}$ by using the $S^K$ and $S^{K-1}$ values, each measured at a predetermined representative time point during $\Delta t$. Alternatively, by combining the time average procedure described with reference to FIG. 5, $\Delta av^K=Sav^K-Sav^{K-1}$, may be computed by using the $Sav^K$ and $Sav^{K-1}$ values, each representing the average of the signal strength over $\Delta t$. Furthermore, instead of changing the parameter Tshld according to the magnitude of the signal strength change for each K, a weight factor for $Err^K(\Theta,\Phi)$ may be determined according to the magnitude of the signal strength change for each K, and multiplied to $Err^K(\Theta,\Phi)$ for the comparison with a fixed Tshld in step 436 of FIG. 4.

Some protocols such as WCDMA use an architecture including a RAKE receiver, which can be utilized in the above algorithms to increase the accuracy of the AOA estimation. In many instances of RF communication, the line of sight between a transmitter and a receiver becomes blocked or shadowed with obstacles such as walls, trees and other objects. Each signal bounce may introduce phase shifts, time delays, attenuations and distortions, giving rise to multipath components of the signal. The multipath components are delayed copies of the original signal travelling through different echo paths, each with a different magnitude and time of arrival at the receiver. Since each component contains original information, the information can be obtained reliably by taking into account the magnitude and time of arrival (phase) of each component.

Figure 7:
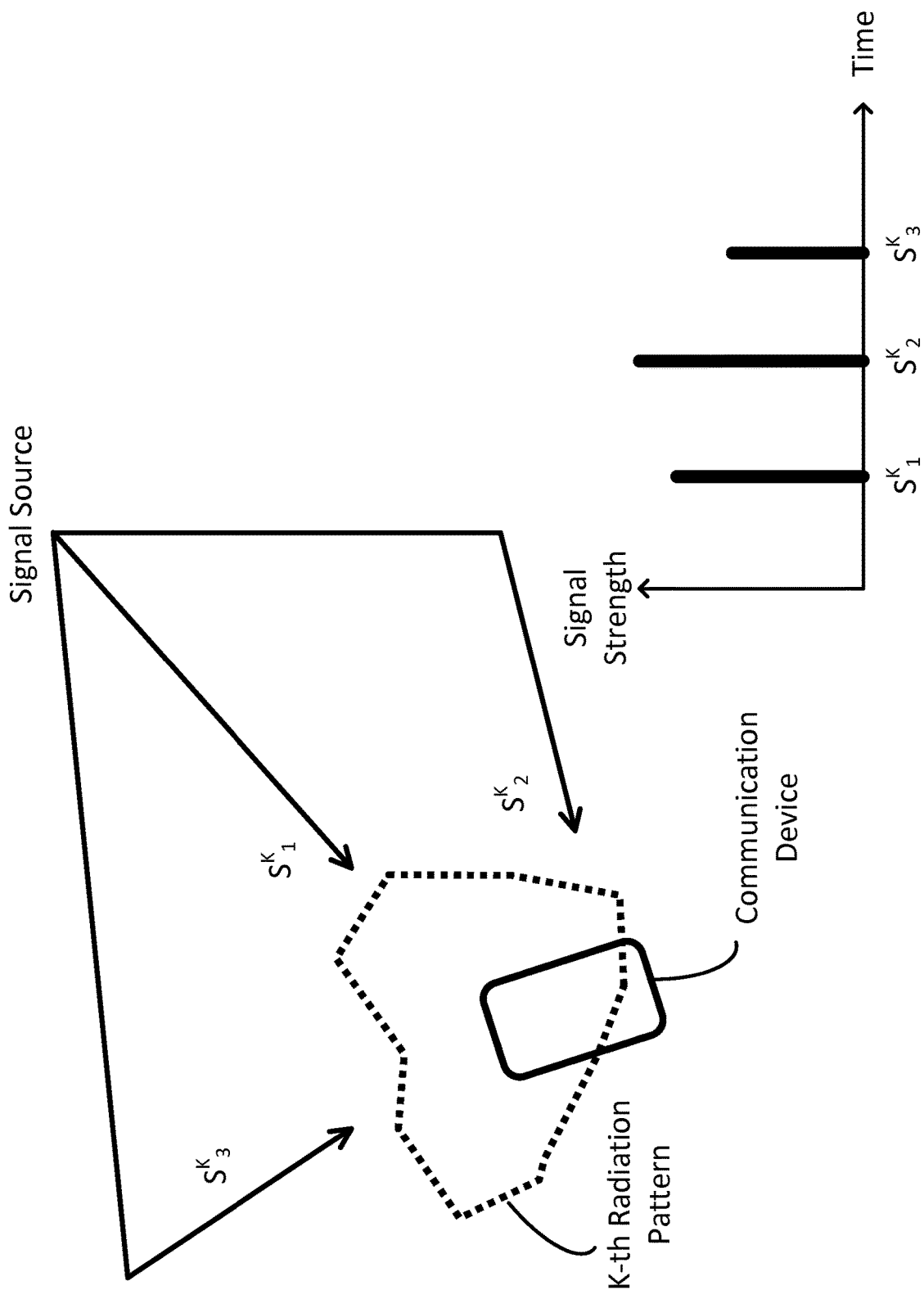
FIG. 7 illustrates an example schematically showing multipath signals and a communication device receiving them.

A RAKE receiver has multiple "fingers," each assigned to receive a different multipath component. The information obtained by all fingers is correlated to make the best use of the different characteristics of the multipath signals. FIG. 7 illustrates an example schematically showing multipath signals and a communication device receiving them. In this example, the communication device is equipped with a modal antenna coupled with a RAKE receiver. The modal antenna is set with the K-th radiation pattern, and the RAKE receiver is receiving the main signal $S^K_1$, the first copy $S^K_2$ of $S^K_1$, and the second copy $S^K_3$ of $S^K_1$. The first copy $S^K_2$ is a multipath component of the main signal with a bounce before incoming to the communication device, and the second copy $S^K_3$ is a multipath component of the main signal with a different bounce before incoming to the communication device. The time of arrival of $S^K_2$ is delayed later than $S^K_1$, and the time of arrival of $S^K_3$ is further delayed than $S^K_2$ in this example.

It is known to those skilled in the art that most of the channel propagation based on the 3GPP standard includes at least one multipath component that arrives at an angle close to the main signal, e.g., within 15 degrees. This fact indicates that if at least one of the components has the incident angle that is close within a certain tolerance to the incident angle of the main signal, the probability is high for the incident angle to be indeed the AOA. Thus, detection of multipath component signals can be utilized to enhance the accuracy, or the confidence level, of the AOA estimation in direction finding algorithms.

Figure 8:
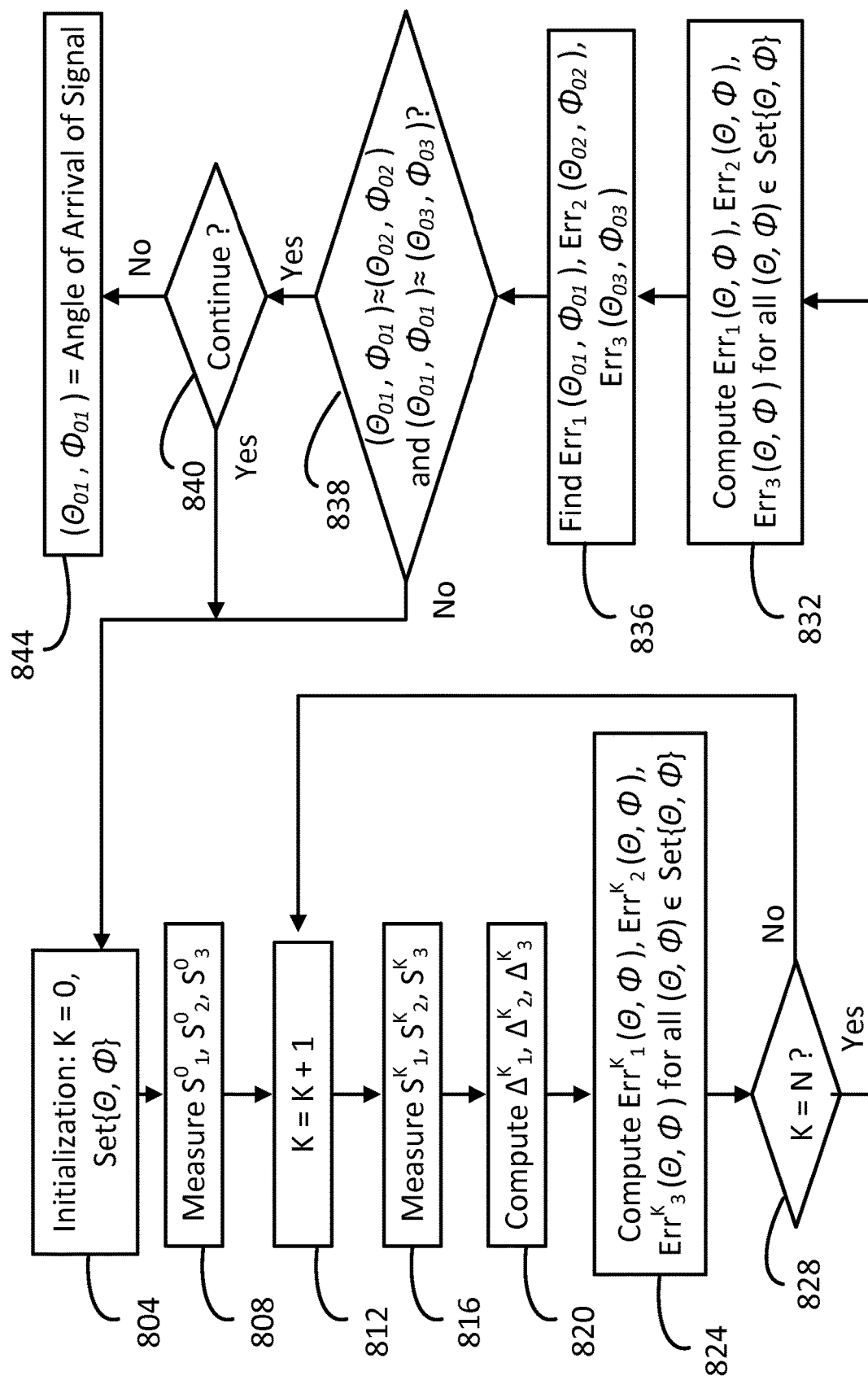
FIG. 8 is a flowchart illustrating an algorithm in which multipath components are utilized to enhance the accuracy, or the confidence level, of the AOA estimation in the first algorithm.

FIG. 8 is a flowchart illustrating an algorithm in which multipath components are utilized to enhance the accuracy, or the confidence level, of the AOA estimation in the first algorithm described earlier with reference to FIG. 3, where the angle that gives the minimum of $Err(\Theta,\Phi)$ is obtained as the AOA of the signal. This example is based on a device including a modal antenna having N modes corresponding to N radiation patterns, and a RAKE receiver coupled to the modal antenna and configured to receive a main signal and two multipath components, i.e., two copies of the main signal. It should be understood that he RAKE receiver can be configured to receive a main signal and one or more copies of the main signal, depending on computation time and other factors. In FIG. 8, the initialization is carried out in step 804, to set the mode, i.e., the radiation pattern of the modal antenna, to be K=0. Additionally, in this step, the discrete values of $(\Theta,\Phi)$ to span in the spherical coordinate are determined according to the required resolution, and stored in Set $\{\Theta,\Phi\}$. In step 808, the signal strengths of the main signal, the first copy of the main signal and the second copy of the main signal in the configuration with the 0-th radiation pattern, $S^0_1, S^0_2, S^0_3$, are measured. Steps 812-828 represent the do-loop to compute $Err^K_1(\Theta,\Phi)$, $Err^K_2(\Theta,\Phi)$, $Err^K_3(\Theta,\Phi)$ iteratively from K=1 to K=N, where $Err^K_1(\Theta,\Phi)$, $Err^K_2(\Theta,\Phi)$, $Err^K_3(\Theta,\Phi)$ are defined as in Eq. (3) based on the signal strengths of the main signal, the first copy of the main signal and the second copy of the main signal $S^K_1, S^K_2, S^K_3$ in the configuration with the K-th radiation pattern. Specifically, after the radiation pattern is changed to the next pattern in step 812, the signal strengths of the main signal, the first copy of the main signal and the second copy of the main signal in the new configuration with the K-th radiation pattern, $S^K_1, S^K_2, S^K_3$, are measured in step 816. Using the previous measurement values, $S^{K-1}_1, S^{K-1}_2, S^{K-1}_3$ the difference in signal strength between the configurations with the K-th radiation pattern and the (K−1)-th radiation pattern can be computed for each signal as in Eq. (2), i.e., $\Delta^K_i = S^K_i - S^{K-1}_i$ where i=1, 2 and 3, in step 820. Using the measured signal strength variations $\Delta^K_i$ and the premeasured and stored $G^K(\Theta,\Phi)$ value, which is the gain of the modal antenna at the angle $(\Theta,\Phi)$ when the K-th radiation pattern is selected, step 824 proceeds to compute $Err^K_i(\Theta,\Phi)$ for each i as in Eq. (3), i.e., $Err^K(\Theta,\Phi) = [E^K(\Theta,\Phi) - \Delta^K_i]^2$, where i=1, 2 and 3 and $E^K(\Theta,\Phi) = G^K(\Theta,\Phi) - G^{K-1}(\Theta,\Phi)$, which is the gain variation, as in Eq. (1). In step 824, this computation is carried out for each pair of $(\Theta,\Phi)$ values in Set $\{\Theta,\Phi\}$. After the computation of $Err^K(\Theta,\Phi)$ for each pair of $(\Theta,\Phi)$ values for K=1 through N, in step 832, $Err^K_1(\Theta,\Phi)$, $Err^K_2(\Theta,\Phi)$, $Err^K_3(\Theta,\Phi)$ for all configurations with different radiation patterns is summed as in Eq. (4) to obtain $Err_1(\Theta,\Phi)$, $Err_2(\Theta,\Phi)$, $Err_3(\Theta,\Phi)$ for each pair of $(\Theta,\Phi)$ values in Set $\{\Theta,\Phi\}$. In step 836, among $Err_i(\Theta,\Phi)$ values for all pairs of $(\Theta,\Phi)$ in Set $\{\Theta,\Phi\}$, $Erri(\Theta,\Phi)$ that gives the minimum is found for each of i=1, 2 and 3. Thus, the $(\Theta,\Phi)$ value that gives the minimum $Erri(\Theta,\Phi)$ is obtained as the AOA $(\Theta_{0i},\Phi_{0i})$ for each of i=1, 2 and 3. In step 838, it is judged if $(\Theta_{01},\Phi_{01})=(\Theta_{02},\Phi_{02})$ and $(\Theta_{01},\Phi_{01})=(\Theta_{03},\Phi_{03})$ within a certain tolerance. If No in this step, it means there is abnormality, and the process goes back to the initialization in step 804. If Yes, it can be determined that the angle $(\Theta_{01},\Phi_{01})$ is the AOA with the high confidence level, and the process proceeds to step 840. If the process is determined to be continued in step 840, the process goes back to step 804 for initialization, and the subsequent steps are repeated. If the process is determined to end, the angle $(\Theta_{01},\Phi_{01})$ is outputted as the AOA in step 844.

Figure 9:
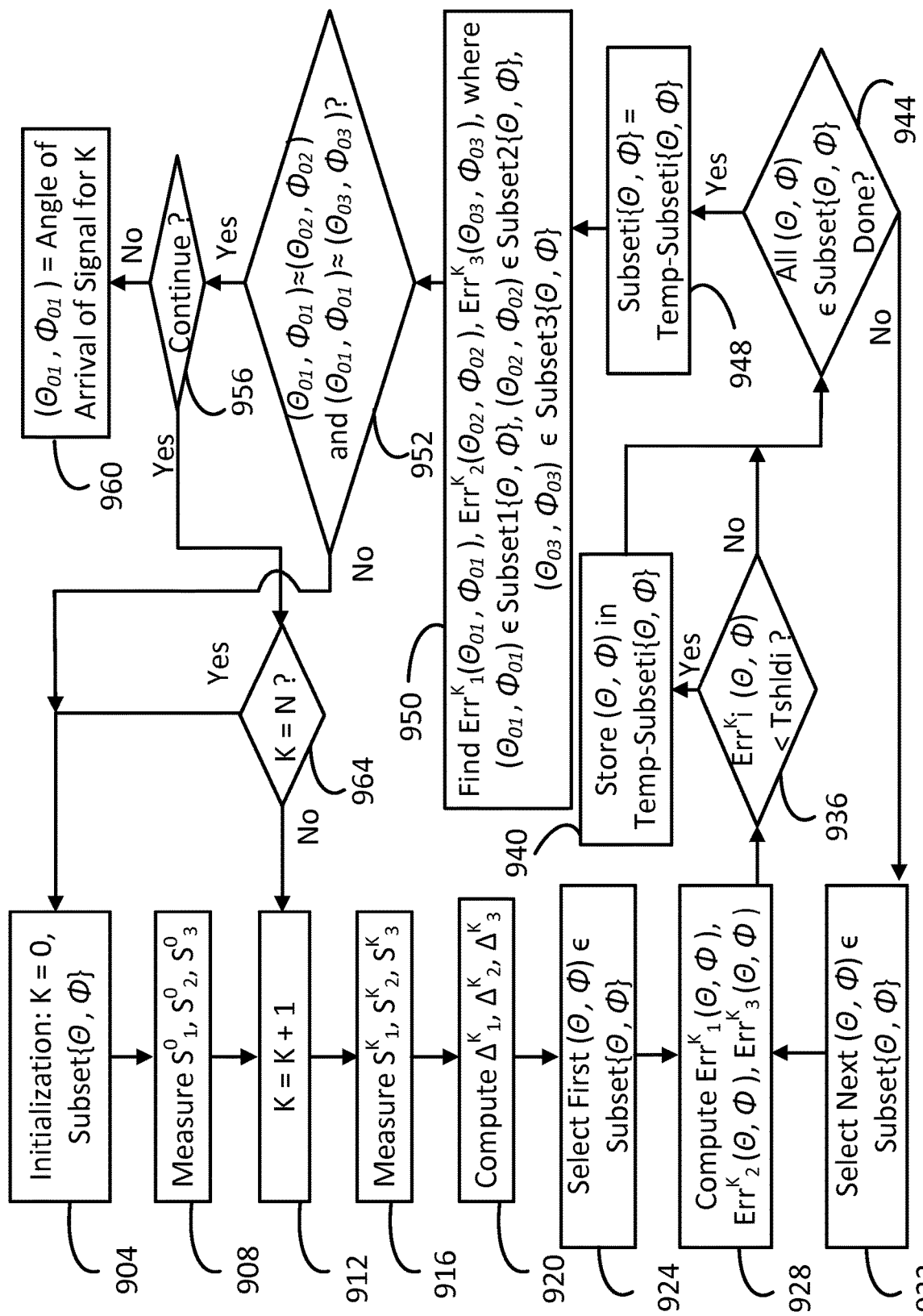
FIG. 9 is a flowchart illustrating an algorithm in which multipath components are utilized to enhance the accuracy, or the confidence level, of the AOA estimation in the second algorithm.

Similar to the above, the multipath component signals can be utilized to enhance the accuracy, or the confidence level, of the AOA estimation in the second algorithm described earlier. FIG. 9 is a flowchart illustrating an algorithm in which multipath components are utilized to enhance the accuracy, or the confidence level, of the AOA estimation in the second algorithm described earlier with reference to FIG. 4, where the angle that gives the minimum $Err^K(\Theta,\Phi)$ is obtained as the AOA of the signal for the K-th mode, where the angle $(\Theta,\Phi)$ is selected from a limited set of angles that satisfy certain criteria. The initialization is carried out in step 904, to set the mode, i.e., the radiation pattern of the modal antenna, to be K=0. Additionally, in this step, the discrete values of $(\Theta,\Phi)$ to span in the spherical coordinate are determined according to certain criteria, and stored in Subset $\{\Theta,\Phi\}$. The angles $(\Theta,\Phi)$ in the initial Subset $\{\Theta,\Phi\}$ may be selected from the original Set $\{\Theta,\Phi\}$ according to an empirical judgment based on the prior computational results or measured data or other sound engineering judgment. In step 908, the signal strengths of the main signal, the first copy of the main signal and the second copy of the main signal in the configuration with the 0-th radiation pattern, $S^0_1$, $S^0_2$, $S^0_3$, are measured. After the radiation pattern is changed to the next pattern in step 912, the signal strengths of the main signal, the first copy of the main signal and the second copy of the main signal in the new configuration with the K-th radiation pattern, $S^K_1$, $S^K_2$, $S^K_3$, are measured in step 916. Using the previous measurement values, $S^{K-1}_1$, $S^{K-1}_2$, $S^{K-1}_3$, the difference in signal strength between the configurations with the K-th radiation pattern and the (K−1)-th radiation pattern can be computed for each signal as in Eq. (2), i.e., $\Delta^{K-1}_i = S^K_i - S^{K-1}_i$, where i=1, 2 and 3, in step 920. In step 924, the first pair of $(\Theta,\Phi)$ is selected from Subset $\{\Theta,\Phi\}$. Using the measured signal strength variations $\Delta^K_i$ and the premeasured and stored $G^K(\Theta,\Phi)$ value, which is the gain of the modal antenna at the angle $(\Theta,\Phi)$ when the K-th radiation pattern is selected, step 928 proceeds to compute $Err^K_i(\Theta,\Phi)$ for each i as in Eq. (3), i.e., $Err^K_i(\Theta,\Phi) = [E^K(\Theta,\Phi) - \Delta^K_i]^2$, where i=1, 2 and 3 and $E^K(\Theta,\Phi) = G^K(\Theta,\Phi) - G^{K-1}(\Theta,\Phi)$, which is the gain variation, as in Eq. (1). After the computation of $Err^K_i(\Theta,\Phi)$ for the pair of $(\Theta,\Phi)$, it is judged in step 936 if the $Err^K_i(\Theta,\Phi)$ value is smaller than a certain threshold, Tshldi, which is related to a tolerance in judging the accuracy of the final AOA, where i=1, 2 and 3. If Yes, the angle $(\Theta,\Phi)$ that satisfies the relationships, $Err^K_1(\Theta,\Phi) <$ Tshld1, $Err^K_2(\Theta,\Phi) <$ Tshld2, $Err^K_3(\Theta,\Phi) <$ Tshld3, may be selected and stored in Temp-Subset1 $\{\Theta,\Phi\}$, Temp-Subset2$\{\Theta,\Phi\}$, Temp-Subset3 $\{\Theta,\Phi\}$, respectively, in step 940. If No in step 936 as well as after step 940, the process proceeds to step 944, where it is judged if all the angles $(\Theta,\Phi)$ in Subset $\{\Theta,\Phi\}$ have been exhausted. If No in step 944, the next pair of angles $(\Theta,\Phi)$ in Subset $\{\Theta,\Phi\}$ is selected in step 932, and the procedure from step 928 through step 932 is repeated until all the angles $(\Theta,\Phi)$ in Subset $\{\Theta,\Phi\}$ are exhausted. In step 948, Subset1$\{\Theta,\Phi\}$ is replaced with Temp-Subset1$\{\Theta,\Phi\}$, which means only the angles $(\Theta,\Phi)$ that satisfy the relationship, $Err^K_i(\Theta,\Phi) <$ Tshldi, are selected and stored as the updated Subseti$\{\Theta,\Phi\}$, where i=1, 2 and 3. In step 950, among $Err^K_i(\Theta,\Phi)$ values for all pairs of $(\Theta,\Phi)$ in Subseti$\{\Theta,\Phi\}$, $Err^K i(\Theta_{0i},\Phi_{0i})$ that gives the minimum is found for each of i=1, 2 and 3. Thus, the $(\Theta_{0i},\Phi_{0i})$ value that gives the minimum $Err^K_i(\Theta,\Phi)$ is obtained as the AOA $(\Theta_{0i},\Phi_{0i})$ for each of i=1, 2 and 3. In step 952, it is judged if $(\Theta_{01},\Phi_{01}) = (\Theta_{02},\Phi_{02})$ and $(\Theta_{01},\Phi_{01}) = (\Theta_{03},\Phi_{03})$ within a certain tolerance. If No in this step, it means there is abnormality, and the process goes back to the initialization in step 904; if Yes, it can be determined that the angle $(\Theta_{01},\Phi_{01})$ is the AOA for the K-th mode with the high confidence level, and the process proceeds to step 956. If the process is determined to be continued in step 956, the process proceeds to step 964 to determine if K=N has been reached. If No, the radiation pattern is changed to the next one at step 912, and the subsequent steps are repeated; if Yes, the process goes back to step 904 for initialization, and the subsequent steps are repeated. If the process is determined to end in step 956, the angle $(\Theta_{01},\Phi_{01})$ is outputted as the AOA for the K-th mode in step 960. When the algorithm is repeated from the step 904 or step 912, angles in Subseti$\{\Theta,\Phi\}$ defined in step 948 may be used for each of i=1, 2 and 3 in the subsequent steps.

Each of the algorithms described so far with reference to FIGS. 3-9 is configured to obtain the AOA of the incoming signal. After the AOA is found, the algorithm can be repeated for any needed times to update the AOA since the signal incidence may change often or continuously. The information obtained in running the algorithm can be utilized for the next time the same algorithm is driven to run. In particular, the $E^K(\Theta,\Phi)$ values may be updated based on the AOA information previously obtained.

Figure 10:
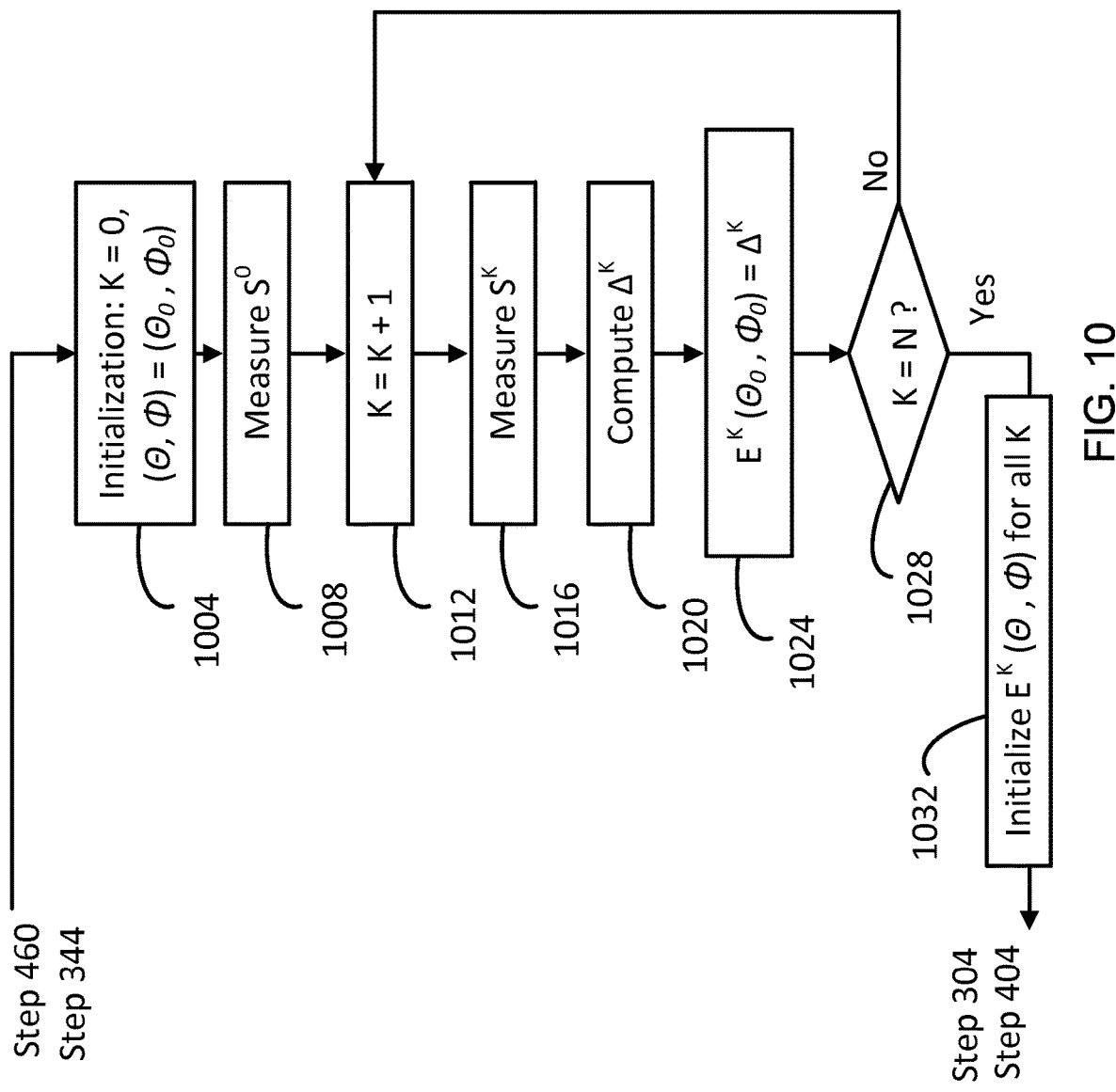
FIG. 10 is a flowchart illustrating the process of updating the gain variations based on the AOA information previously obtained.

FIG. 10 is a flowchart illustrating the process of updating the $E^K(\Theta,\Phi)$ values, i.e., the gain variations, based on the AOA information previously obtained. Namely, this process represents a post AOA process. After obtaining the AOA $(\Theta_0,\Phi_0)$ in the first algorithm, the second algorithm or its variation described earlier, the process may proceed to step 1004, where K=0 and $(\Theta,\Phi) = (\Theta_0,\Phi_0)$ are set. In step 1008, the signal strength $S^0$ in the configuration with the 0-th radiation pattern is measured. After the radiation pattern is changed to the next pattern in step 1012, the signal strength in the new configuration with the K-th radiation pattern, $S^K$, is measured in step 1016. Using the previous measurement value $S^{K-1}$, the difference in signal strength between the configurations with the K-th radiation pattern and the (K−1)-th radiation pattern can be computed as in Eq. (2), i.e., $\Delta^K = S^K - S^{K-1}$, in step 1020. The measured signal strength variation $\Delta^K$ is then stored as $E^K(\Theta_0,\Phi_0)$ in step 1024. Thus, the more accurate $E^K(\Theta_0,\Phi_0)$ value is obtained based on the measured $\Delta^K$ value, and can be used for the next time the first algorithm, the second algorithm or its variation is driven to run. The above steps are repeated for the next K in step 1028, until all the modes are exhausted. The $E^K(\Theta,\Phi)$ values for the angles $(\Theta,\Phi)$ other than the angle $(\Theta_0,\Phi_0)$ may be obtained by using the premeasured and stored $G^K(\Theta,\Phi)$ values. In this way, the $E^K(\Theta,\Phi)$ values for all K's as well as for all angles $(\Theta,\Phi)$ are initialized for running the algorithm for the next time around with better accuracy. The accuracy in direction finding is expected to go up, as the number of runs increases and $E^K(\Theta,\Phi)$ is updated many times by using the present updating algorithm.

Another post AOA process may be configured to involve decision making as to whether the whole direction finding process should be restarted. In this process, the difference between the signal strength variation, i.e., $\Delta^K$, and the gain variation at the angle $(\Theta_0,\Phi_0)$, i.e., $E^K(\Theta_0,\Phi_0)$, can be checked. If the difference is within a certain threshold, it can be determined that the angle $(\Theta_0,\Phi_0)$ is still close to the AOA; if not, the angle $(\Theta_0,\Phi_0)$ is no longer the AOA, and thus the complete direction finding process may be restarted. FIG. 11 is a table illustrating an example of gain variations and signal strength variations used for the decision making. The gain variation at the angle $(\Theta_0,\Phi_0)$ can be $E^K(\Theta_0,\Phi_0) = G^K(\Theta_0,\Phi_0) - G^{K-1}(\Theta_0,\Phi_0)$ as in Eq. (1), or an average of $E^K(\Theta_0,\Phi_0)$ values obtained after running several times the direction finding algorithm with the updating process illustrated in FIG. 10. The signal strength variation is $\Delta^K = S^K - S^{K-1}$ as in Eq. (2), which is a measured value. In the first step of this table, the previous mode 0 and the current mode 1 are selected, the gain variation at $(\Theta_0,\Phi_0)$ is obtained to be −2.10 dB, and the $\Delta^K$ is measured to be −1.50 dB. In the second step of this table, the previous mode 0 and the current mode 2 are selected, the gain variation at $(\Theta_0,\Phi_0)$ is obtained to be −1.05 dB, and the $\Delta^K$ is measured to be −3.50 dB. In the third step of this table, the previous mode 1 and the current mode 2 are selected, the gain variation at $(\Theta_0,\Phi_0)$ is obtained to be −4.20 dB, and the $\Delta^K$ is measured to be −4.10 dB. By using a predetermined threshold value of 0.7 dB, for example, it is observed that the difference between the gain variation and the signal strength variation in the second step is larger than the threshold value. Thus, it can be determined that the signal direction has changed, and the full direction finding process be restarted to find the new AOA.

The direction finding algorithms described thus far utilize the gain of the modal antenna with the K-th radiation pattern at the angle $(\Theta,\Phi)$, denoted as $G^K(\Theta,\Phi)$, following Eqs.

(1)-(3). As explained earlier, the gain value for each radiation pattern at each selected angle can be premeasured and stored in the memory to be used for the algorithms, and updated as the direction finding processes are being carried out. The accuracy of the direction finding may be enhanced by explicitly including the phase information associated with the gain and the measured signal strength. In this case, Eqs. (1)-(3) take their corresponding complex forms, where the phase of the gain with the K-th radiation pattern is denoted by $\varphi^K$, and j is defined as the imaginary unit. Here, the phase $\alpha^K$ of the gain is a function of two angles, $\Theta$ and $\Phi$, in the spherical coordinate, but the notation is simplified in the following equations. The phase $\varphi^K$ of the gain of the modal antenna can be premeasured and stored in the memory for each radiation pattern and for each selected angle. The complex gain variation $E^K(\Theta,\Phi) \exp(j\varphi^K)$ denotes the difference in gain between the current mode having the K-th radiation pattern and the previous mode having the (K−1)-th radiation pattern at the angle $(\Theta,\Phi)$, and is defined as follows:

$$E^K(\Theta,\Phi)\exp(j\varphi^K)=G^K(\Theta,\Phi)\exp(j\varphi^K)-G^{K-1}(\Theta,\Phi)\exp(j\varphi^{K-1}). \quad \text{Eq. (6)}$$

The complex signal strength variation $\Delta^K \exp(j\beta^K)$ denotes the difference in signal strength between the configurations with the K-th radiation pattern and the (K−1)-th radiation pattern, now including the phase $\beta^K$ representing the measured phase of the signal $S^K$, and is defined as follows:

$$\Delta^K \exp(j\beta^K)=S^K \exp(j\beta^K)-S^{K-1}\exp(j\beta^{K-1}). \quad \text{Eq. (7)}$$

The difference between the complex gain variation and the complex signal strength variation is expressed as follows:

$$\text{Err}^K(\Theta,\Phi)=\|E^K(\Theta,\Phi)\exp(j\varphi^K)-\Delta^K \exp(j\beta^K)\|^2. \quad \text{Eq. (8)}$$

Note that because the modulus squared operator ($\|\ \|^2$) is used for the complex difference in Eq. (8), the $\text{Err}^K(\Theta,\Phi)$ becomes entirely real. Thus, the scalar form of the error metric $\text{Err}^K(\Theta,\Phi)$ may be used in Eqs. (1)-(3) even for the present complex case; however, in each of the direction finding algorithms, the complex form as expressed in Eqs. (6)-(8) may be substituted.

Figure 12:
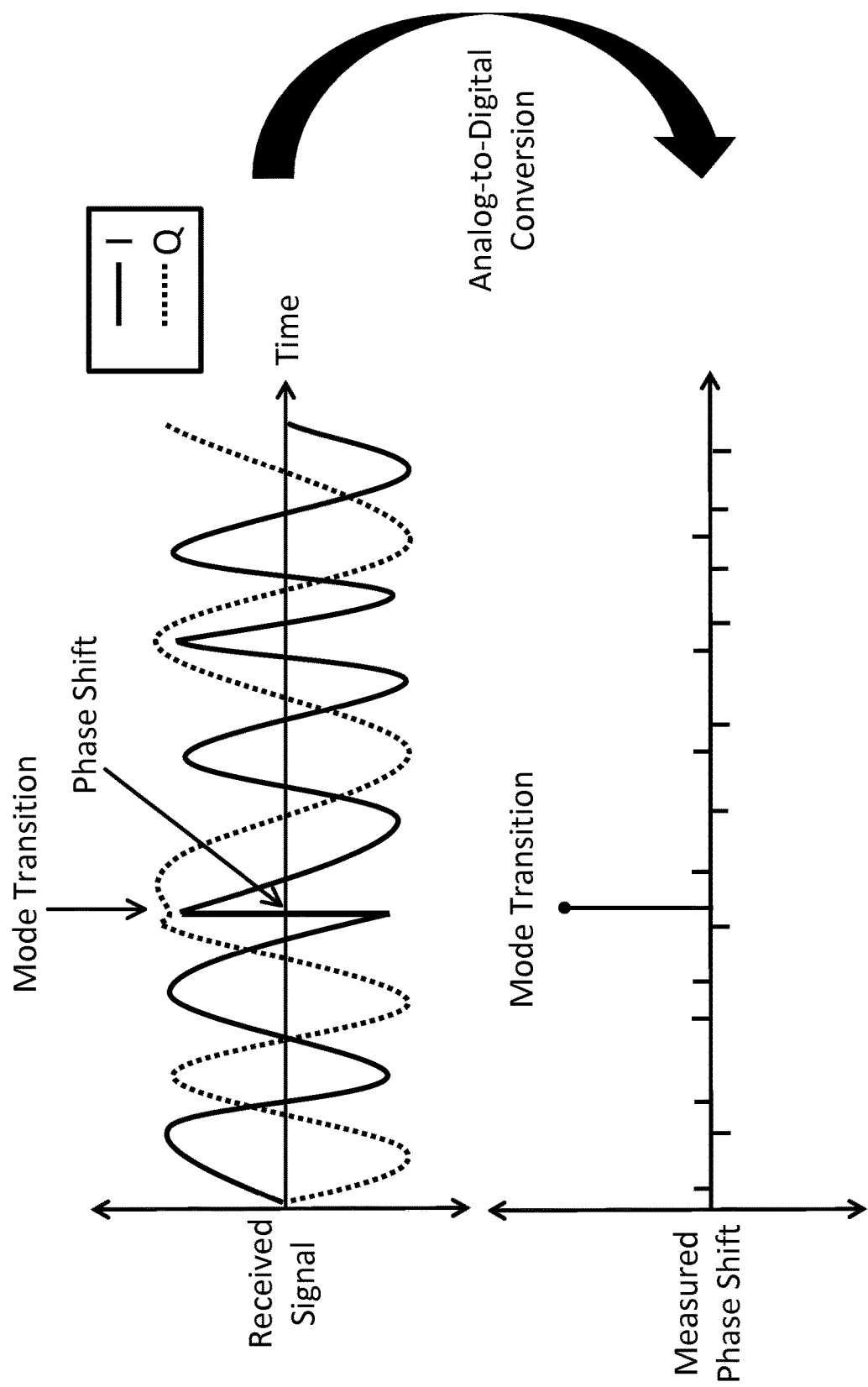
FIG. 12 schematically illustrates the measurement of the phase shift of the signal strength during the transition between modes of the antenna.

The phase $\beta^K$ of the signal $S^K$ in Eq. (7) can be obtained from the phase shift measurement. FIG. 12 schematically illustrates the measurement of the phase shift of the signal strength during the transition from the (K−1)-th mode to the K-th mode. The top figure illustrates an example of a received signal waveform, where the in-phase (I) component and the quadrature-phase (Q) component are measured. The mode transition is occurring at the time point indicated by an arrow, and the phase shift is observed at the point. By carrying out the analog-to-digital conversion, the amount of phase shift is obtained as illustrated in the bottom figure. This information is used to obtain $\beta^K$ and $\beta^{K-1}$ in Eq. (7).

Figure 13:
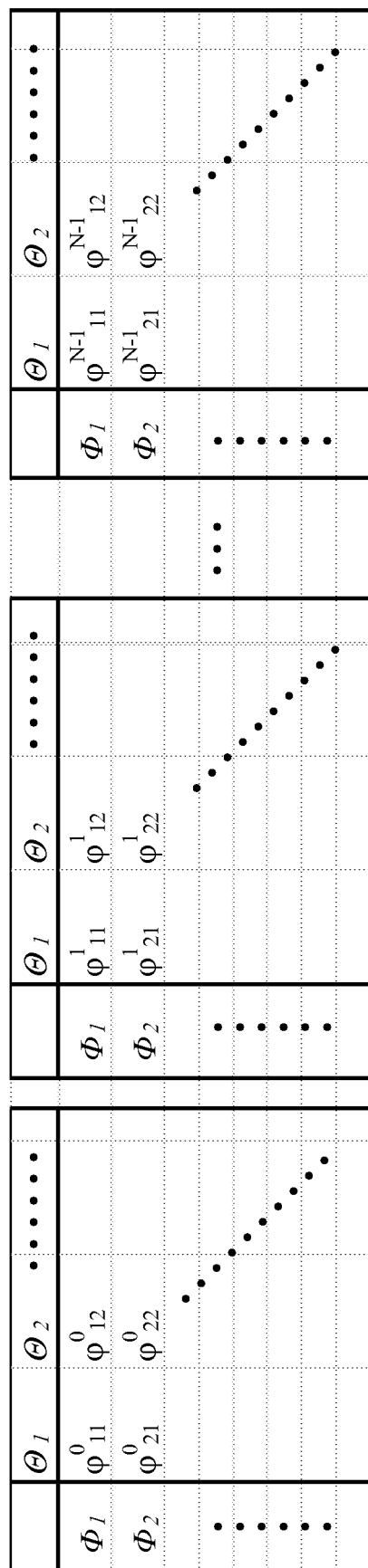
FIG. 13 illustrates a portion of the look-up table showing the phase data of the gain according to the angles and the modes, i.e., radiation patterns of the antenna.

Similar to the gain values used in the previous direction finding algorithms, the phase $\varphi^K$ of the gain of the modal antenna in Eq. (6) can be obtained based on the data that has been premeasured and stored in a memory, such as in the form of a look-up table. FIG. 13 illustrates a portion of the look-up table showing the phase data of the gain according to the angles $(\Theta,\Phi)$ and the modes, i.e., radiation patterns, K=0 through (N−1). The stored data can be used to obtain $\varphi^K$ and $\varphi^{K-1}$ in Eq. (6). The phase data can be updated as the direction finding processes are being carried out, and used for the algorithms for enhanced accuracy.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be exercised from the combination, and the claimed combination may be directed to a subcombination or a variation of a subcombination.

What is claimed is:

1. A method for obtaining a direction of a signal incoming to a communication device having a modal antenna, the method comprising:
    obtaining, by one or more processors, a gain variation between adjacent modes of a plurality of modes in which the modal antenna is configurable at each of a plurality of angles, each of the plurality of modes having a distinct radiation pattern;
    obtaining, by the one or more processors, a signal strength variation between the adjacent modes at each of the plurality of angles;
    determining, by the one or more processors, a difference value associated with the adjacent modes at each of the plurality of angles based, at least in part, on the gain variation and the signal strength variation; and
    determining, by the one or more processors, an angle of arrival of the signal based, at least in part, on the difference value associated with the adjacent modes at each of the plurality of angles,
    wherein the adjacent modes comprise a first mode in which the modal antenna is currently configured and a second mode in which the modal antenna. was configured immediately prior to being, configured in the first mode.

2. The method of claim 1, wherein determining the angle of arrival of the signal comprises determining, by the one or more processors, the difference value associated with the adjacent modes at a first angle of the plurality of modes is smaller than the difference value associated with every other pair of adjacent modes at the first angle.

3. The method of claim 1, wherein obtaining the gain variation between adjacent modes of the plurality of modes at each of the plurality of angles comprises:
    obtaining, by the one or more processors, first data indicative of a gain of the modal antenna at each of the plurality of angles while configured in the first mode;
    obtaining, by the one or more processors, second data indicative of a gain of the modal antenna at each of the plurality of angles while configured in the second mode; and
    determining, by the one or more processors, the gain variation between the first mode and the second mode based, at least in part, on the first data and the second data.

4. The method of claim 1, wherein obtaining the signal strength variation between the adjacent modes at each of the plurality of angles comprises:
    obtaining, by the one or more processors, first data indicative of a signal strength of the signal at each of the plurality of angles while configured in the first mode; and obtaining, by the one or more processors, second data indicative of a signal strength of the signal at each of the plurality of angles while configured in the second mode.

5. The method of claim 4, wherein the first data and the second data are obtained via a rake receiver that is communicatively coupled to the modal antenna.

6. A communication device comprising:
a modal antenna configurable in a plurality of modes, each of the plurality of modes having a distinct radiation pattern;
one or more processors; and
one or more memory devices, the one or more memory device storing computer-readable instructions that, when executed by the one or more processors, cause the one or more processors to perform operations, the operations comprising:
obtaining a gain variation between adjacent modes of a plurality of modes in which the modal antenna is configurable at each of a plurality of angles, each of the plurality of modes having a distinct radiation pattern;
obtaining a signal strength variation between the adjacent modes at each of the plurality of angles;
determining a difference value associated with the adjacent modes at each of the plurality of angles based, at least in part, on the gain variation and the signal strength variation; and
determining an angle of arrival of a signal received by the modal antenna based, at least in part, on the difference value associated with the adjacent modes at each of the plurality of angles,
wherein the adjacent modes comprise a first mode in which the modal antenna is currently configured and a second mode in which the modal antenna was configured immediately prior to being configured in the first mode.

7. The communication device of claim 6, wherein the modal antenna comprises a driven element and one or more parasitic elements.

8. The communication device of claim 7, wherein the driven element comprises an isolated magnetic dipole element.

9. The communication device of claim 6, Wherein obtaining the gain variation between adjacent modes of the plurality of modes at each of the plurality of angles comprises:
obtaining first data indicative of a gain of the modal antenna at each of the plurality of angles while configured in the first mode;
obtaining second data indicative of a gain of the modal antenna at each of the plurality of angles while configured in the second mode; and
determining the gain variation between the first mode and the second mode based, at least in part, on the first data and the second data.

10. The communication device of claim 6, wherein obtaining the signal strength variation between adjacent modes of the plurality of modes at each of the plurality of angles comprises:
obtaining first data indicative of a signal strength of the signal at each of the plurality of angles while configured in the first mode; and
obtaining second data indicative of a signal strength of the signal at each of the plurality of angles while configured in the second mode.

* * * * *